United States Patent [19]

Klinar

[11] Patent Number: 5,465,631
[45] Date of Patent: Nov. 14, 1995

[54] SHAFT WITH A WORM FORMED ONTO IT, AND MILLING MACHINE FOR MANUFACTURING A WORM

[75] Inventor: Robert Klinar, Bietigheim-Bissingen, Germany

[73] Assignee: ITT Automotive Europe GmbH, Germany

[21] Appl. No.: 190,154

[22] PCT Filed: Jul. 31, 1992

[86] PCT No.: PCT/EP92/01735

§ 371 Date: Jun. 15, 1994

§ 102(e) Date: Jun. 15, 1994

[87] PCT Pub. No.: WO93/03297

PCT Pub. Date: Feb. 18, 1993

[30] Foreign Application Priority Data

Aug. 6, 1991 [DE] Germany .................. 41 26 026.0

[51] Int. Cl.⁶ .................. F16H 55/08; B23F 21/14
[52] U.S. Cl. .................. 74/458; 29/893.31; 409/65; 409/76; 409/165
[58] Field of Search .................. 74/458; 29/893.31; 409/65, 76, 38, 165

[56] References Cited

U.S. PATENT DOCUMENTS 1,329,805  2/1920  Schurr .................. 409/38

FOREIGN PATENT DOCUMENTS 1575617  3/1972  Germany .
2008995  6/1979  United Kingdom .

*Primary Examiner*—Allan D. Herrmann
*Attorney, Agent, or Firm*—Dykema Gossett

[57] ABSTRACT

A system performing a conical transition from a shaft to the core diameter of a worm is disclosed. The disclosed system includes inserting a rough milling machine in an axial direction before a disk milling machine used for milling the worm. The rough milling machine is especially manufactured integrally with the disk milling machine. The teeth of the rough milling machine are shorter than the teeth on the disk milling machine, and the teeth of the rough milling machine preferably define a truncated-cone shaped covering.

7 Claims, 2 Drawing Sheets

SHAFT WITH A WORM FORMED ONTO IT, AND MILLING MACHINE FOR MANUFACTURING A WORM

TECHNICAL FIELD

The invention relates to shafts, and move particularly to a rotor shaft of an electric motor with a worm formed onto it and with the root line diameter of the worm being smaller than the diameter of the shaft or of a part directly adjoining the worm.

BACKGROUND OF THE INVENTION

Shafts having a worm formed onto it are used, for example, where a worm of a worm gear is to be driven by an electric motor, it being absolutely possible that the worm is formed directly onto the rotor shaft of the electric motor. The worm concerned can be an overhung worm as well as a worm mounted at both ends. In the latter case the diameter of the part of the shaft adjoining the one end of the worm can be larger than the part of the shaft adjoining the other end of the worm. However, it is also possible that there is an equal diameter of the shaft at both sides of the worm. Furthermore, the part of the shaft directly adjoining the one end and/or the other end of the shaft can have a diameter equal to the crown circle of the worm, but also can be different herefrom, for example larger.

If the root line diameter of the worm is smaller than the diameter of the part of the shaft adjoining the end, notch tensions can occur at the transition from the beginning of the worm into the adjacent part of the shaft and/or at the end of the worm to the part of the worm adjoined thereto. This can be noticed especially, if the worm is made by milling. In particular, in the latter case, it often happens that the crown circle of the worm corresponds directly to the diameter of the shaft or to the diameter of the part or the parts of the shaft directly adjoining the worm. The reason for this tension is that an abrupt transition occurs from the shaft diameter to the root line diameter. This can be noticed above all, when the worm is made by means of a disk milling machine.

SUMMARY OF THE INVENTION

The present object is, to improve upon a shaft of the type described at the beginning in such a way that no, or only a reduced, notch tension occurs in the transition from the shaft into the worm.

In order to accomplish this object, it is suggested according to the invention that the shaft with the worm formed onto it is developed having a less abrupt transition from the groove bottom of the worm into the neighbouring shaft. In this manner, the complete cross-section does not reduce in one single step from the shaft to the core of the worm, and therefore, it is effectively reduces or eliminates notch tensions in this area.

The manner in which the transition from the complete shaft diameter onto the core diameter of the worm is accomplished depends on the dimensions of the shaft and the worm as well as on the used material and the strain which is to be expected.

It is preferred that, in the area where the depth of the groove is reduced, the depth of the groove is not constant but increases, in axial direction progressing from the beginning of the worm or the end of the worm, respectively. In this way, a constant reduction of the core diameter of the shaft up to the first tooth of the worm can be obtained, preferably starting from the outside diameter of the shaft, consequently the depth of the groove increases from zero.

In principle, the bottom of the groove can be bent in this area and for example can it be conformed to the cylindrical bend of a worm wheel planned for combing with the worm. In view of the manufacturing capabilities of the milling machine, however, a linear increase of the depth of the groove in axial direction seems preferable.

Another object is to develop a disk milling machine for manufacturing a worm formed onto the shaft.

In order to solve this object a disk milling machine is disclosed. This disk milling machine forms the worm onto the shaft like a state-of-the-art disk milling machine. Because of the special shape of the rough milling machine and its assignment to the actual disk milling machine, seen in axial direction of the shaft of the milling machine, the transition from the diameter of the shaft to the core diameter of the worm occurs automatically during the milling process.

Advantageous improvements upon this disk milling machine are also disclosed including an imaginary covering protruding in an axial direction from the teeth of the rough milling machine as far as to the nearest tooth flank of the teeth of the disk milling machine. For a better understanding of these statements it is referred to the description of the embodiment.

DETAILED DESCRIPTION OF THE PREFERRED EMBODIMENTS

Figure 1:
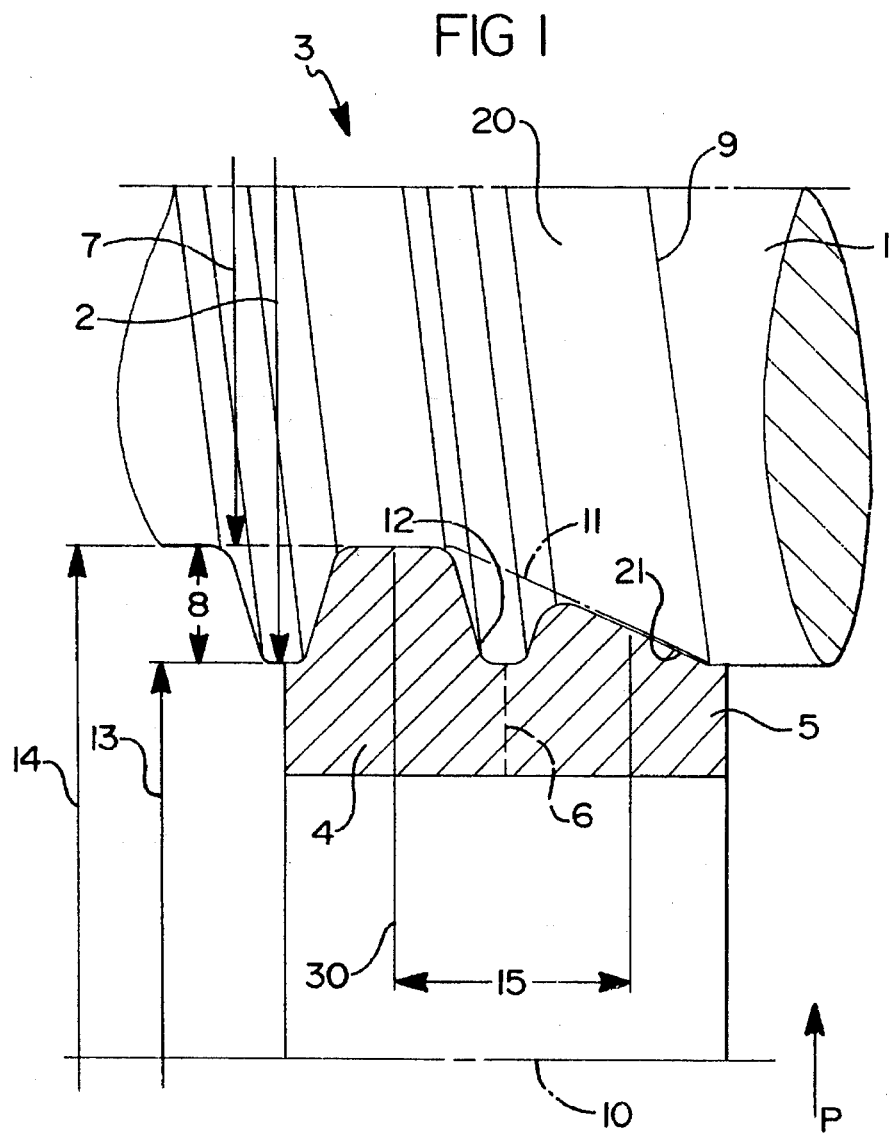
FIG. 1 is half a radial section through the disk milling machine according to the invention with a partial presentation of worm and shaft.

Now referring to FIG. 1, the crown circle diameter 2 of the worm 3 corresponds to the diameter of the shaft 1. The worm 3 is integrally formed onto the shaft 1 or worked out of the material of shaft 1, respectively.

For this purpose a disk milling machine 4 was used. According to the invention the disk milling machine is connected with the rough milling machine, especially integrally manufactured. The part of the drawn special disk milling machine situated on the left side of the broken line 6 corresponds to the conventional embodiment of a disk milling machine for manufacturing worms 3. Insofar since this portion is conventional, no further explanation is necessary.

The rough milling machine 5 mills a preliminary groove 20 comprising a groove bottom 21, which, seen in a radial section of the shaft 1, becomes deeper sloping from the crown circle of the worm 3, the groove being cut to its full depth by the disk milling machine 4. Therefore, the preliminary groove 20 with the inclined groove bottom 21 exists only at the beginning of the worm or the end of the worm, respectively at a certain circumference angle after the milling process.

The transition between the preliminary groove 20 with the groove bottom 21 and the complete shaft, as well as the transition from the groove with the full depth to the depth of the preliminary groove 20 made by the rough milling machine, is made at the end of the milling process when milling machine and shaft are separated.

Figure 2:
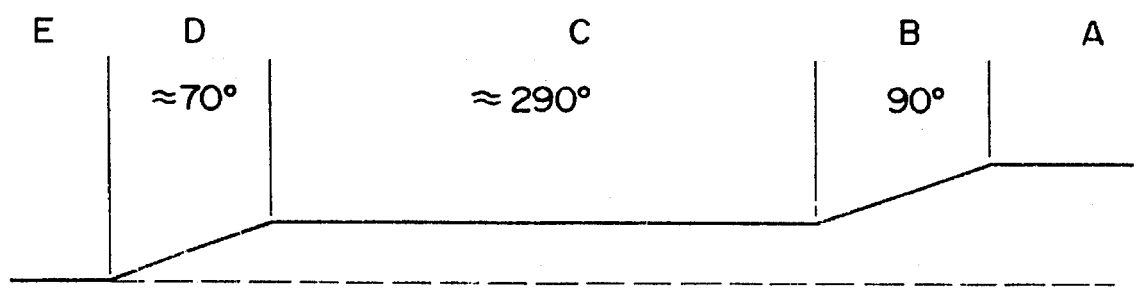
FIG. 2 is a rolled-out presentation of the depth of the groove progressing in the direction of rotation.

A graph showing the depth of the preliminary groove 20 as it progresses from the runout of the rough milling machine to the root of the first worm spiral, is indicated at A in FIG. 2. The depth of the groove increases at first by an angle of 90 degrees (area B), which corresponds to the angle about which the shaft continued to turn after the shaft and the milling machine drive apart (or separate). After that, the depth remains constant for about 290 degrees (area C), and then declines over an angle of approximately 70 degrees (area D) to the depth of the groove 8 (area E). This depth is maintained over the remaining length of shaft 1. The length of the area D of approximately 70 degrees is based on the fact that, at this point, the milling machine 4 has already reached the deepest level of the preliminary groove 20 (in axial direction). On the other side of the preliminary groove 20, where its depth is zero, the runout of the milling machine 4 amounts to 90 degrees. On the other hand, the rough milling machine 5 comprises a runout angle of zero at the latter side of the preliminary groove 20 (since there it is already situated on the height of the diameter of the shaft 1).

Beside the crown circle diameter 2, the root line diameter 7 of the worm 3 is illustrated (broken away) in the drawing. Hence, also the height of the teeth of the worm 3 is defined. However, the height of the teeth decreases progressively towards the shaft 1 according to the illustration. The spacing, the lead 15, and the crown circle diameter 2 remain along the complete length of the worm, however, the root line diameter increases to the value of the crown circle diameter 2. If a part of the shaft 1 adjoins the left end of the worm 3 (not drawn), and the diameter of the joining shaft is larger than the root line diameter 7, the depth of the groove 8 shall increase in the mentioned way from "zero" to the complete value of the depth of the groove 8. In the case where a worm 3 is situated between two parts of a shaft 1, at the beginning of the worm the depth of the groove increases, and then at the end of the worm the depth of the groove decreases, from the full value to "zero".

As can be taken from the drawing, seen in radial direction, the height of the teeth of the rough milling machine 5 at the highest point is about only half the height of the milling teeth of the disk milling machine 4. Furthermore, the headline does not run on a concentricity circular cylinder relative to the geometrical axis of the milling machine 10, but is inclined thereto. An imaginary covering 11 illustrated in the drawing surrounding the teeth of the rough milling machine 5, which is extended over the adjoining tooth gap 12, has the shape of a truncated cone. In this case, the small truncated cone diameter corresponds to the root line diameter 13 of the disk milling machine 4, while the large diameter of the truncated cone corresponds to the crown circle diameter 14 of the disk milling machine 4. With this special milling machine the worm is manufactured in the same way as with the conventional disk milling machine, the difference being that a conical transition from the shaft 1 to the core diameter of the worm 3 is produced automatically.

With the exception of the special shaping, the teeth of the rough milling machine 5 correspond to the teeth of the disk milling machine 4, and in particular, the same number of teeth is provided in each case.

Figure 3:
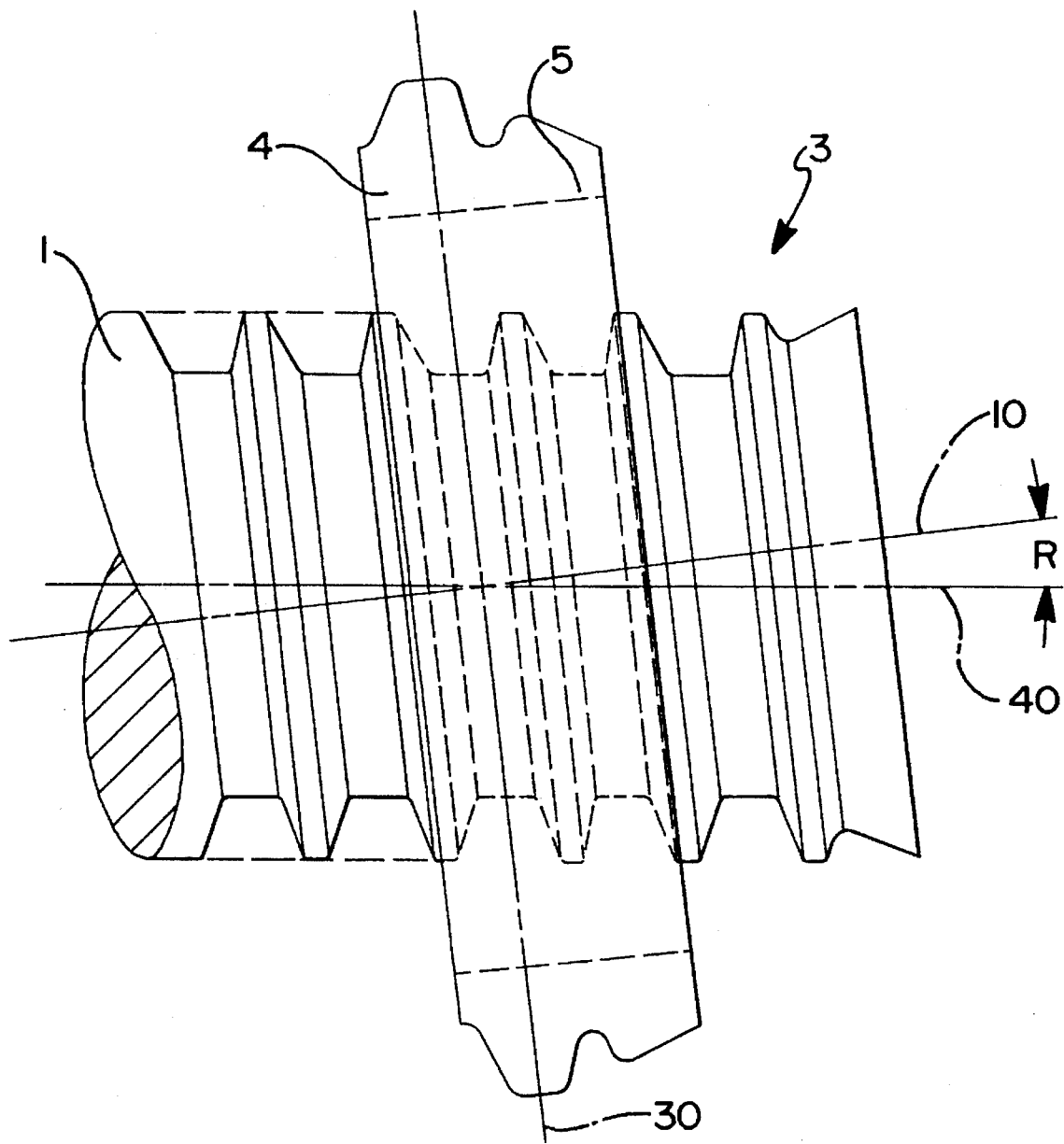
FIG. 3 is a view taken in the direction of arrow P of FIG. 1.

During the milling process the axis 10 of the milling machine 4, 5 has to be inclined relative to the axis of the worm (see FIG. 3) according to the lead of the worm 3. The axis 10 would consequently cut the plane of projection according to FIG. 1 in an exact presentation. Preferably the respective line of intersection of the milling machine 4, (the line on which the groove reaches its full depth during the milling process and which lies beneath the axis 10 in FIG. 2), intersects the axis 40 of the worm 3 in the center plane 30 of the milling machine 4. The teeth of the milling machine 4 are then arranged symmetrically to this center plane 30. The teeth of the rough milling machine 5 have to be adjusted in their shape with regard to the teeth of the disk milling machine 4, apart from the principally different cross-section (smaller height and inclined decline in height), as they do not cut the worm 3 at its highest point, but laterally thereof, (see distance R in FIG. 3), seen from the axis of the milling machine. On the other hand, however, they should not remove so much that no step occurs in the flanks of the worm. Preferably, the teeth of the rough milling machine even leave some material at the tooth flanks so that the final tooth shape is defined by the disk milling machine 4. In case the worm is milled in two steps, namely first with the rough milling machine 5 and then with the disk milling machine 4, this problem will not arise. However, the two step process requires more time.

What is claimed is:

1. A rotor shaft of an electric motor, of the type including a milled worm formed onto an end of the shaft, and the root line diameter of the worm being smaller than a shaft diameter directly adjoining the worm, comprising:

a tapered groove at an end portion of said worm, said tapered groove defining a first flank of a first worm tooth and also defining a bottom surface tapering from a first diameter at the first flank of the first worm tooth to a larger second diameter at an end portion of the shaft, the tapered groove extending circumferentially a distance equal to a circumference of the worm minus a portion of the circumference corresponding to a runout angle of the milling machine; and a full depth groove defining a second flank of the first tooth and also defining a bottom surface between the first tooth and a second tooth at a root circle of the worm.

2. A shaft according to claim 1, wherein the bottom surface of the tapered groove tapers linearly in an axial direction.

3. A shaft according to claim 2, wherein a slope of the bottom surface of the groove is chosen such that an imaginary, axial extension of the bottom of the tapered groove reaches the root circle of the worm at the root of the second flank of the first worm tooth.

4. A machine for forming a worm onto a shaft, comprising:

a disk milling machine, having teeth for cutting; and a rough milling machine having teeth for cutting inserted before the teeth of the disk milling machine in an axial direction, said teeth of said milling machine being lower than the teeth of the disk milling machine, wherein, in the axial direction, the distance of the centers of the teeth of the rough milling machine from the centers of the teeth of the disk milling machine correspond to a lead of the worm.

5. A disk milling machine according to claim 4, wherein the height of the teeth of the rough milling machine are decreasing towards an end of the milling machine.

6. A disk milling machine according to claim 5, wherein an imaginary covering of the teeth of the rough milling machine has the shape of a truncated cone, the small diameter of the truncated cone corresponding to the root line diameter of the rough milling machine, while the large diameter corresponds to the crown circle diameter of the disk milling machine, and the height of the truncated cone corresponds roughly to a lead of the worm.

7. A disk milling machine according to claim 4, wherein the width of the root of all disk milling machine teeth is equal.

* * * * *